United States Patent
Demerath

(10) Patent No.: US 6,800,023 B2
(45) Date of Patent: Oct. 5, 2004

(54) AIR VENT, ESPECIALLY FOR VEHICLE AIR-CONDITIONING

(75) Inventor: Michael Demerath, Hüffler (DE)

(73) Assignee: TRW Automotive Electronics & Components GmbH & Co. KG, Enkenbach-Alsenborn (DE)

( * ) Notice: Subject to any disclaimer, the term of this patent is extended or adjusted under 35 U.S.C. 154(b) by 0 days.

(21) Appl. No.: 10/023,596

(22) Filed: Dec. 18, 2001

(65) Prior Publication Data

US 2002/0094774 A1 Jul. 18, 2002

(30) Foreign Application Priority Data

Jan. 16, 2001 (DE) .................................... 201 00 740 U

(51) Int. Cl.⁷ ................................................ B60H 1/34
(52) U.S. Cl. ...................................... 454/155; 454/320
(58) Field of Search ................................ 454/155, 319, 454/320

(56) References Cited

U.S. PATENT DOCUMENTS

| | | |
|---|---|---|
| 2,293,065 A | 8/1942 | Kiczales |
| 5,036,753 A | 8/1991 | Ostrand et al. |
| 5,063,833 A * | 11/1991 | Hara et al. .................. 454/152 |
| 5,080,002 A | 1/1992 | Soethout et al. |
| 5,470,276 A * | 11/1995 | Burnell et al. .............. 454/155 |
| 5,591,079 A * | 1/1997 | Saida .......................... 454/155 |
| 5,690,550 A * | 11/1997 | Mikowski .................... 454/155 |

FOREIGN PATENT DOCUMENTS

| | | |
|---|---|---|
| DE | 7202132 | 4/1972 |
| DE | 3529463 C2 | 2/1987 |
| DE | 3628449 A1 | 2/1988 |
| DE | 19528302 A1 | 2/1997 |
| DE | 19728305 C2 | 1/1999 |
| DE | 29817513 U1 | 2/1999 |
| EP | 0899136 A1 | 3/1999 |
| JP | 61-86529 * | 5/1986 |

* cited by examiner

Primary Examiner—Harold Joyce
(74) Attorney, Agent, or Firm—Tarolli, Sundheim, Covell & Tummino L.L.P.

(57) ABSTRACT

An air vent, especially for vehicle air-conditioning, comprises a frame, a plurality of vanes that are pivotally arranged around a first axis, and at least one coupling element with which each of the vanes is coupled. The coupling element is capable of being adjusted relative to the first axis between a neutral position in which the vanes are parallel to each other, and a comfort position in which at least some of the vanes are swiveled in directions opposite each other.

19 Claims, 6 Drawing Sheets

AIR VENT, ESPECIALLY FOR VEHICLE AIR-CONDITIONING

TECHNICAL FIELD

The invention relates to an air vent, especially for vehicle air-conditioning, comprising a frame and a plurality of vanes that are pivotally arranged around a first axis.

BACKGROUND OF THE INVENTION

The vanes, which can be arranged either horizontally or vertically, can be used to adjust the direction of the air flow emerging from the vent. The air flow is normally directed in such a way that it does not strike a vehicle occupant directly since this is felt to be unpleasant. However, at a high air throughput rate and the correspondingly high speeds with which the air flows out of the air vent, the prior art vents cannot reliably prevent the vehicle occupant from being exposed to an air flow that is felt to be unpleasant.

BRIEF SUMMARY OF THE INVENTION

Therefore, the object of the invention is to provide an air vent with which it can be prevented that the vehicle occupant is exposed to an air flow that is felt to be unpleasant, even at a high air throughput rate.

This is achieved in an air vent which, provided for use in vehicle air-conditioning, comprises a frame, a plurality of vanes that are pivotally arranged around a first axis, and at least one coupling element with which each of the vanes is coupled. The coupling element is capable of being adjusted relative to the first axis between a neutral position in which the vanes are parallel to each other, and a comfort position in which at least some of the vanes are swiveled in directions opposite each other. In this manner, when the oppositely swiveled vanes are arranged so as to spread out fan-like, a diverging air flow can be generated in which lower flow rates prevail than with an air flow having a constant cross section. Thus, even at a high air throughput rate, it can be prevented that the emerging air flow strikes the vehicle occupant at high speeds.

Advantageous embodiments of the invention will be apparent from the subclaims.

DETAILED DESCRIPTION OF THE PREFERRED EMBODIMENTS

Figure 1:
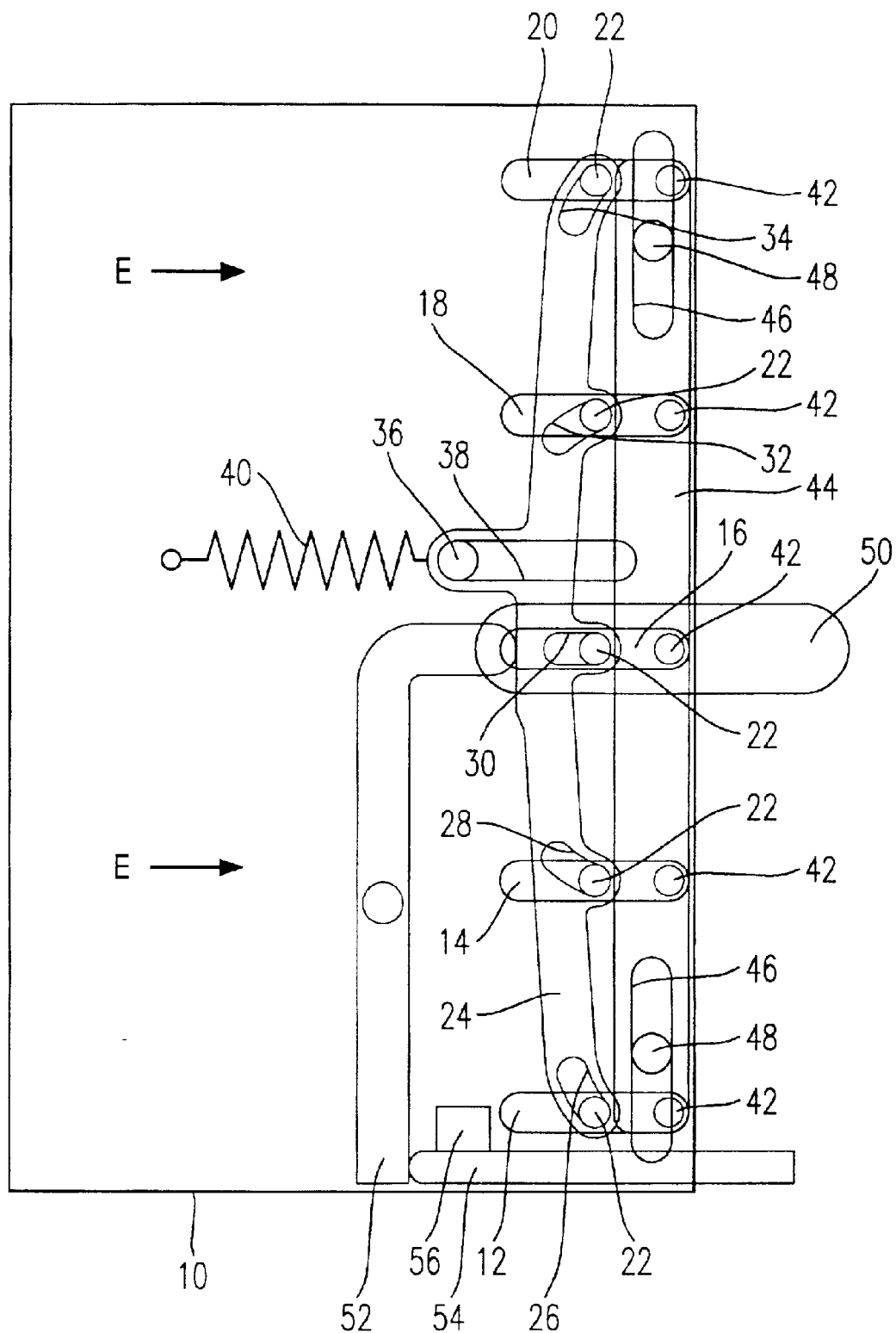
FIG. 1 is a schematic side view of an air vent according to a first embodiment of the invention, with the coupling element in the neutral position.

FIG. 1 shows an air vent according to a first embodiment, with a frame 10 in which, in the embodiment shown, five vanes 12, 14, 16, 18, 20 are pivotally arranged. Each of the vanes is pivoted on a first coupling element 24 by means of a pin 22 that is situated approximately in the middle between the front edge of the vane facing the outside of the vent and the back edge of the vane facing the inside of the vent. For this purpose, the first coupling element 24 is provided with a plurality of slotted links 26, 28, 30, 32, 34 that are associated with the pins 22.

The first coupling element is provided with a guide pin 36 that is accommodated in a sliding guide 38 on the frame. A return spring 40 is connected to the first coupling element 24 and the other end of said spring is attached to the frame 10. The return spring 40 pulls the first coupling element 24 to the left, with regard to FIG. 1, into a so-called neutral position in which the pins 22 lie on the right-hand edge of the corresponding slotted link.

The front edge, that is to say, the right-hand edge with regard to FIG. 1, of the vanes 12, 14, 16, 18, 20 are provided with a pin 42 that is rotatably received in a second coupling element 44. The second coupling element 44 can be moved in a translational direction by means of two sliding guides 46 on two guide pins 48 that are permanently attached to the vehicle.

If the first coupling element 24 is in the neutral position as shown in FIG. 1, the vanes 12, 14, 16, 18, 20 can be swiveled in parallel to each other in order to adjust the direction of an air flow emerging from the air vent. In order to adjust the vanes, there is a gripping projection 50 mounted on the vane 16.

An actuation element 52 is mounted on the frame 10, and it is configured as a two-arm lever here. One end of the actuation element 52 is in contact with the first coupling element 24 and its other end with a push-button 54 that is accessible from the outside of the air vent. A latching mechanism 56—shown here schematically—interacts with the push-button 54. By pushing the push-button 54 into the air vent, the first coupling element 24 makes, via the actuation element 52, a translational motion towards the second coupling element 44, that is to say, to the right relative to FIG. 1, into the so-called comfort position shown in FIG. 2. In this position, the first coupling element 24 is held by the latching mechanism 56 until the actuation element 52 is released by once again actuating the push-button 54.

Figure 2:
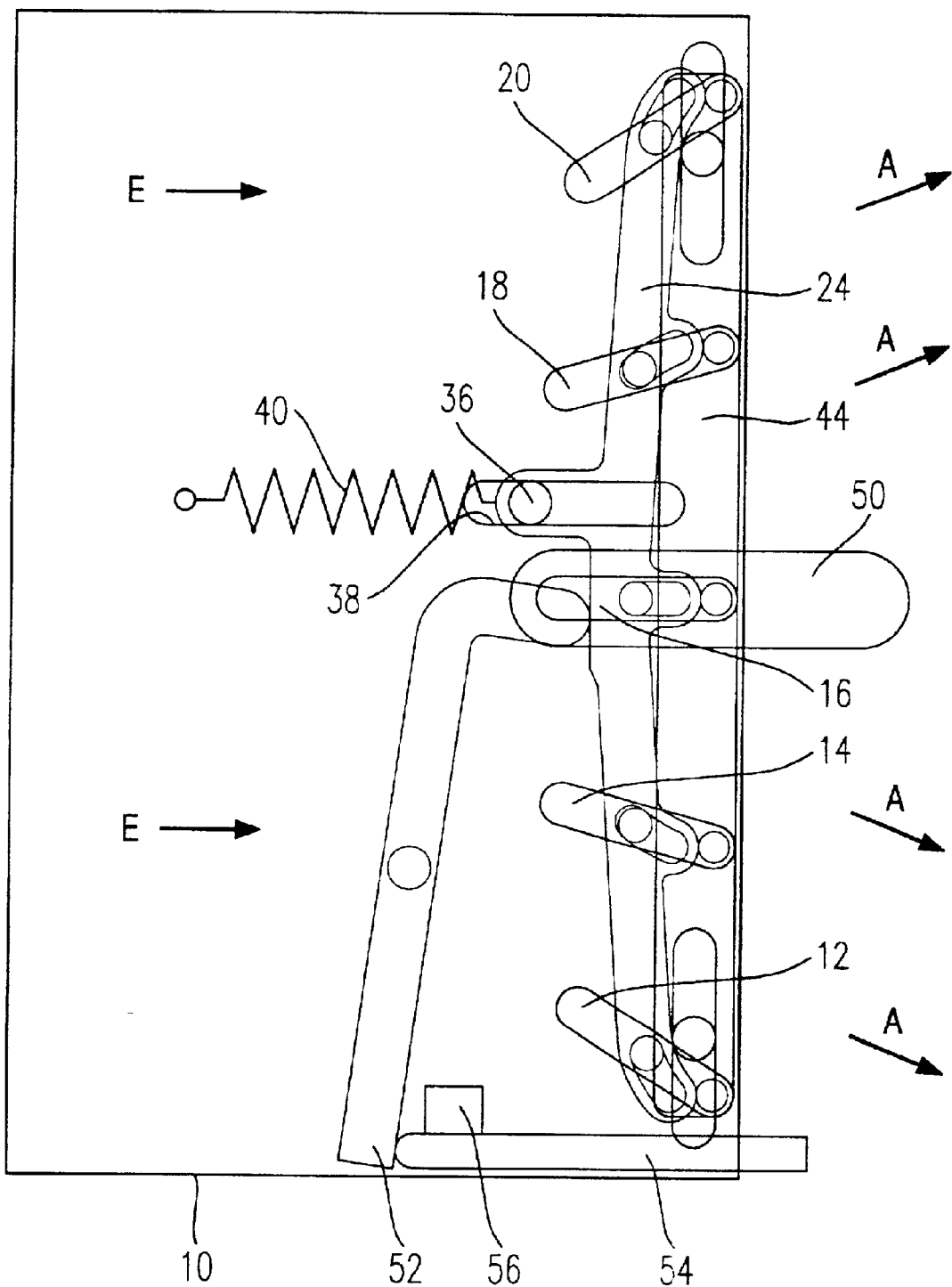
FIG. 2 shows the air vent of FIG. 1, with the coupling element in the comfort position.

As can be seen in FIG. 2, due to the movement of the first coupling element 24, the pins 22 of the vanes are now situated on the left-hand edge of the slotted links 26, 28, 30, 32, 34. The slotted link 30, which is associated with the vane 16 located in the middle, the so-called neutral vane, extends in a straight line and parallel to the adjustment direction of the first coupling element 24, said direction being predefined by the sliding guide 38. For this reason, the alignment of the neutral vane does not change when the first coupling element is adjusted. The slotted links 26, 34 that are associated with the two outer vanes 12, 20 extend in a curve and are sharply inclined relative to the adjustment direction of the first coupling element 24, said direction being predefined by the sliding guide 38. For this reason, when the first coupling element is adjusted by the pin 22, the outer vanes 12, 20 are swiveled in directions opposite each other, in such a way that their pins 22 move closer to the neutral vane. The slotted links 28, 32, which are associated with the intermediate vanes 14, 18 that lie between the neutral vane and the outer vanes, likewise have a curved design, but they are less sharply inclined relative to the direction of movement of the first coupling element 24, said direction being predefined by the sliding guide 38. For this reason, the intermediate vanes 14, 18 are also swiveled when the first coupling element is adjusted, but to a lesser extent than the outer vanes 12, 20. Due to the spread-out alignment of the vanes 12, 14, 16, 18, 20, the air flow entering the air vent in the direction of the arrows E leaves the air vent as a diverging air flow, as is shown by the arrows A.

When the push-button 54 is actuated again, the latching mechanism 56 releases the push-button. As a result, the first coupling element 24, under the effect of the return spring 40, can return to its neutral position in which the vanes 12, 14, 16, 18, 20 once again lie parallel to each other.

The comfort position shown in FIG. 2 with spread-out vanes also makes it possible to adjust the vanes by actuating the gripping projection 50. In so doing, the spread-out alignment of the vanes is largely maintained.

According to an alternative embodiment not shown in the drawings, the return spring 40, which acts between the frame and the first coupling element, can be replaced by one or more return springs that act between the first and the second coupling element. In this manner, restoring forces can be avoided when the vanes are in an inclined position.

According to alternative embodiment not shown in the drawings, an appropriate arrangement of the slotted links 26, 28, 30, 32, 34 can also achieve that the vanes 12, 14, 16, 18, 20 are not spread out fan-like when the first coupling element is adjusted but rather are arranged in a converging fashion. This leads to a converging air stream.

Figure 3:
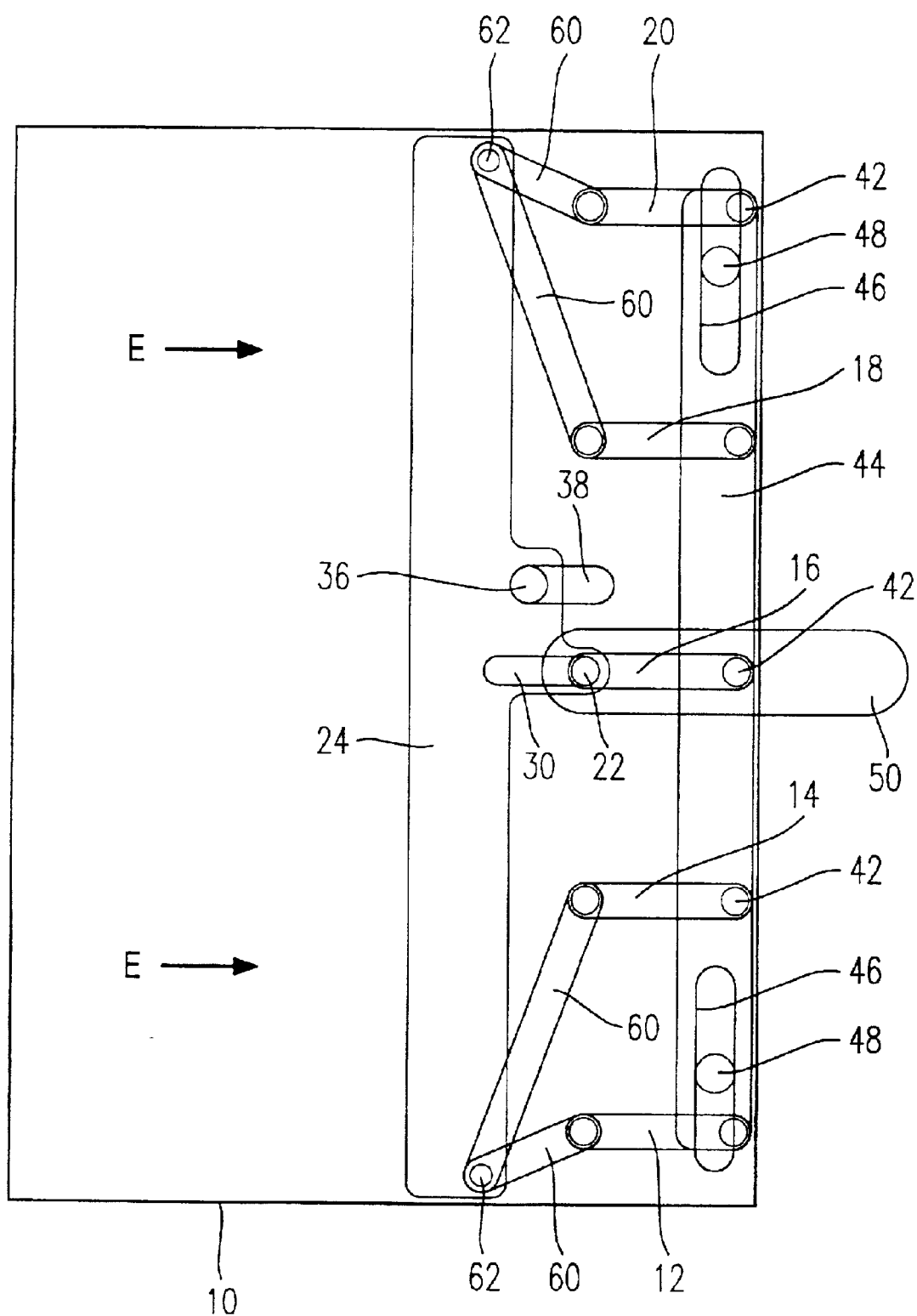
FIG. 3 is a schematic side view of an air vent according to a second embodiment of the invention, with the coupling element in the neutral position.

FIG. 3 shows an air vent according to a second embodiment. The same reference numerals are used for the components known from the first embodiment, and reference is made to the explanations given above. So as to achieve a clear depiction, the actuation element, the push-button and the latching mechanism, which serve to adjust the first coupling mechanism, as well as the return spring for the first coupling element, are not shown.

Unlike the first embodiment, with the second embodiment, no slotted link guides are used for the coupling of the vanes to the first coupling element, but rather, in each case, a coupling rod 60 for each of the outer and intermediate vanes. Each of these coupling rods is attached to its associated vane by the pin 22. The other end of the coupling rods is pivotally attached to the first coupling element by another pin 62. Here, the coupling rods 60 of an outer vane 12 or 20 and the adjacent intermediate vane 14 or 18 are mounted together on one single pin 62; this pin 62, as seen from the neutral vane, lies further outside than the respective outer vane.

Figure 4:
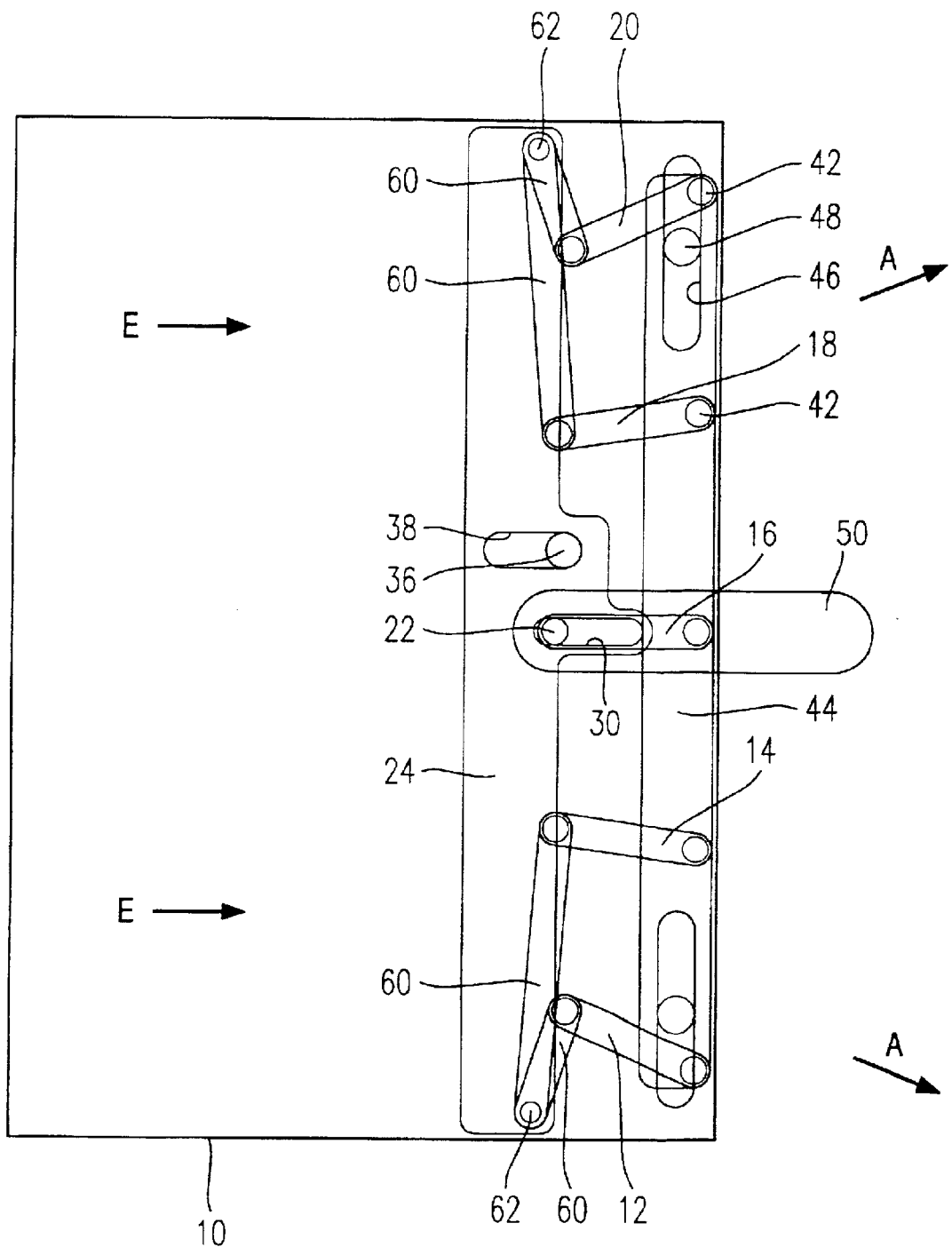
FIG. 4 shows the air vent of FIG. 3, with the coupling element in the comfort position.

Mounting the two coupling rods for an outer and an intermediate vane on one pin results in a simple structure. This structure can readily produce the geometry necessary for the adjustment of the vanes so that, when the first coupling element 24 is moved into the comfort position shown in FIG. 4, the outer vanes 12, 20 are swiveled to a greater extent than the intermediate vanes 14, 18, and the spread-out arrangement of the vanes in the nature of a fan is established.

Figure 5:
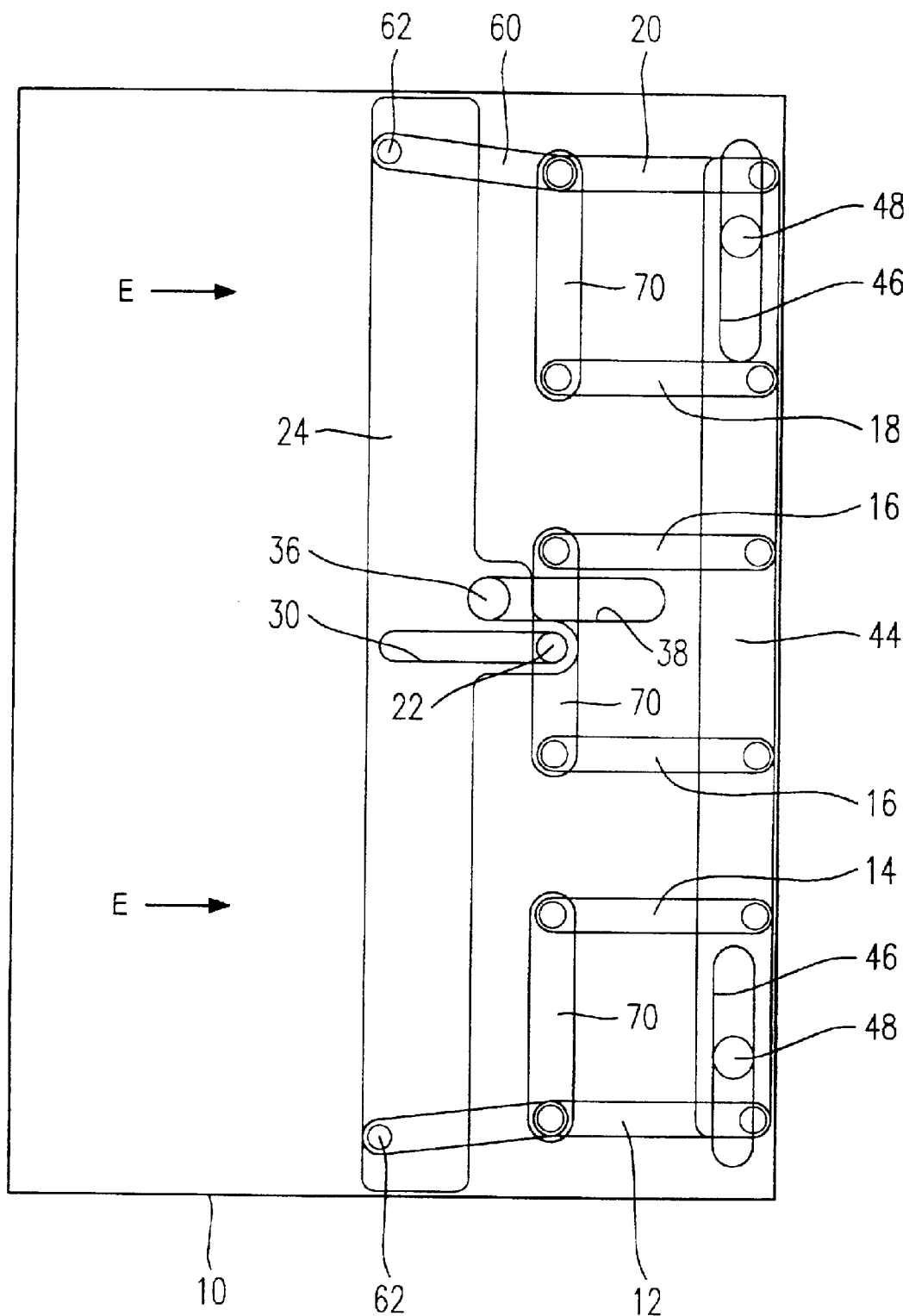
FIG. 5 is a schematic side view of an air vent according to a third embodiment of the invention, with the coupling element in the neutral position.

FIG. 5 shows an air vent according to a third embodiment. The same reference numerals are used for the components known from the first and second embodiments, and reference is made to the explanations given above. So as to achieve a clear depiction, the actuation element, the push-button and the latching mechanism, which serve to adjust the first coupling mechanism, as well as the return spring for the first coupling element, are not shown.

The principle of the air vent according to the third embodiment is equal to that of the second embodiment; the main difference is that each outer vane 12; 20 is connected with the adjacent intermediate vane 12; 18 by means of a connection member 70 so that they are adjusted in parallel with each other. Moreover, now two neutral vanes 16 are provided which are likewise connected to each other by a connection member 70.

Each connection member 70 of the outer and intermediate vanes is connected to the first coupling element 24 by a coupling rod 60 that is mounted on the first coupling element by the pin 62. The connection member of the two neutral vanes is mounted on the first coupling element by the pin 22 that engages the slotted link 30 in the first coupling element.

Figure 6:
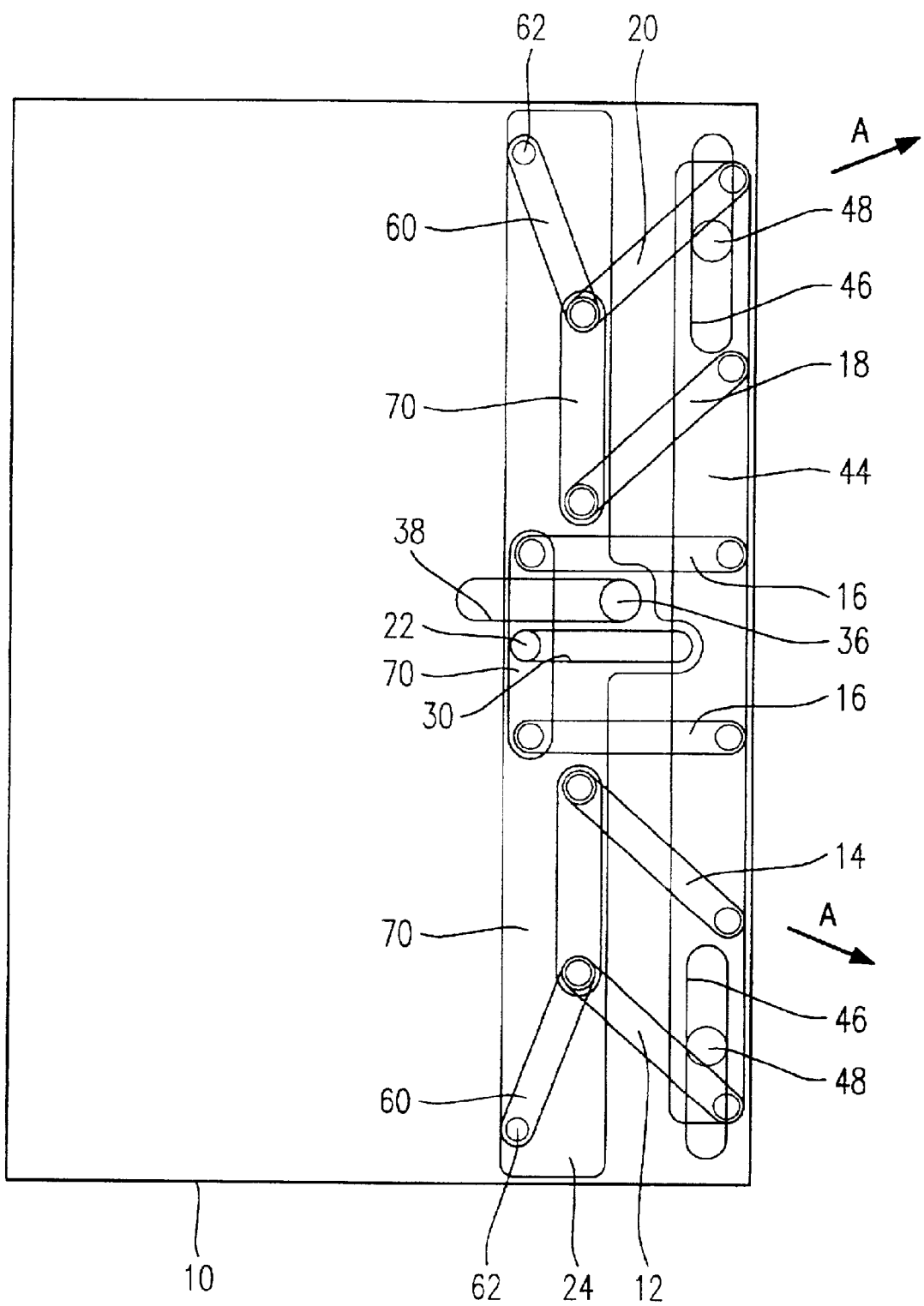
FIG. 6 shows the air vent of FIG. 5, with the coupling element in the comfort position.

If the first coupling element 24 is moved out of the neutral position shown in FIG. 5 and into the comfort position shown in FIG. 6, the two neutral vanes 16 remain in their position since the slotted link 30 extends in a straight line and parallel to the adjustment direction of the first coupling element 24, said direction being predefined by the sliding guide 38. In contrast, the outer vanes and the intermediate vanes are swiveled in directions opposite each other since the connection members 70 of the coupling rods 60 are adjusted towards each other. All in all, the result is a spread-out air flow.

What is claimed is:

1. An air vent comprising a frame, a plurality of vanes that are pivotally arranged around a first axis, and at least one coupling element with which each of said vanes is coupled, said coupling element being capable of being adjusted relative to said first axis between a neutral position in which said vanes are parallel to each other, and a comfort position in which at least some of said vanes are swiveled in directions opposite each other, said coupling element being pivotally coupled with said vanes by means of a slotted link guide, said slotted link guide consisting of a slotted link in said coupling element and a pin provided on said corresponding vane and engaging said slotted link, said slotted link being associated with a neutral vane extending in a straight line and wherein an intermediate vane and an outer vane are provided on either side of said neutral vane, said slotted link associated with said outer vane being more strongly inclined relative to said neutral vane than said slotted link associated with said intermediate vane.

2. An air vent comprising a frame, a plurality of pivotal vanes mounted in said frame, and a single coupling element for coupling all of said vanes, and being capable of being adjusted relative to said vanes between a neutral position in which said vanes are parallel to each other, and a comfort position in which at least some of said vanes are swiveled by said single coupling element in directions opposite each other, and at least one return spring is provided that biases said coupling element into said neutral position.

3. The air vent according to claim 2, wherein said return spring acts between said coupling element and said frame.

4. The air vent according to claim 2, wherein said return spring acts between said coupling element and one of said vanes.

5. An air vent comprising a frame, a plurality of vanes that are pivotally arranged around a first axis, and at least one coupling element with which each of said vanes is coupled, said coupling element being capable of being adjusted relative to said first axis between a neutral position in which said vanes are parallel to each other, and a comfort position in which at least some of said vanes are swiveled in directions opposite each other, a second coupling element being provided that is mounted to slide on said frame and on which said vanes are arranged to pivot around said first axis.

6. The air vent according to claim 5, wherein said vanes are arranged so as to spread out fan-like in said comfort position so that a diverging air flow is generated.

7. The air vent according to claim 5, wherein a sliding guide is provided by means of which said coupling element is mounted so that said coupling element can slide on said frame.

8. The air vent according to claim 5, wherein said coupling element can be adjusted in a translational direction.

9. The air vent according to claim 5, wherein said second coupling element slides in a direction perpendicular to a sliding direction of said first coupling element.

10. The air vent according to claim 5, further including an actuation element on said frame, said actuation element interacting with said coupling element and defining a structure separate from said coupling element.

11. The air vent according to claim 5, wherein said coupling element is connected to at least one of said vanes by means of a coupling rod.

12. The air vent according to claim 11, wherein said actuation element is provided with a push-button that is accessible from outside of said air vent.

13. The air vent according to claim 11, wherein a latching mechanism is provided that can hold said actuation element in a pushed-in position so that said coupling element remains in said comfort position until a subsequent actuation.

14. The air vent according to claim 5, wherein said coupling element is connected to at least one of said vanes by means of a coupling rod.

15. The air vent according to claim 14, wherein at least one neutral vane is provided that is connected to said coupling element by a straight-line slotted link guide, and wherein an intermediate vane and an outer vane are provided on either side of said neutral vane, said intermediate and outer vanes being connected to said coupling element by at least one coupling rod.

16. The air vent according to claim 15, wherein said outer vanes and said intermediate vanes are each connected to said coupling element by a coupling rod and wherein said two coupling rods of an outer vane and of an adjacent intermediate vane are mounted on a common pin on said coupling element.

17. The air vent according to claim 16, wherein said common pin on which said coupling rods are mounted, as seen from said neutral vane, lies further outside than the respective outer vane, and wherein said coupling rod associated with said outer vane together with a direction defined by said straight-line slotted link guide encloses a smaller angle than with said coupling rod associated with an adjacent intermediate vane.

18. The air vent according to claim 15, wherein said outer vanes and said adjacent intermediate vanes are connected to each other by a connection member, and said coupling rod engaging said connection member.

19. The air vent according to claim 15, wherein two neutral vanes are provided which are connected to each other by a connection member, and wherein said connection member is connected to said coupling element by means of said slotted link guide.

* * * * *